United States Patent
Treggiden

(10) Patent No.: US 6,874,043 B2
(45) Date of Patent: Mar. 29, 2005

(54) DATA BUFFER

(75) Inventor: Ronald Thomas Treggiden, Ringwood (GB)

(73) Assignee: Bridgeworks Ltd., Hampshire (GB)

( * ) Notice: Subject to any disclaimer, the term of this patent is extended or adjusted under 35 U.S.C. 154(b) by 379 days.

(21) Appl. No.: 10/127,240

(22) Filed: Apr. 22, 2002

(65) Prior Publication Data

US 2003/0056039 A1 Mar. 20, 2003

Related U.S. Application Data

(63) Continuation-in-part of application No. 09/788,326, filed on Feb. 16, 2001, now abandoned.

(30) Foreign Application Priority Data

Oct. 17, 2000 (GB) .............................................. 0025495
Oct. 17, 2001 (GB) .............................................. 0124979

(51) Int. Cl.[7] .............................. G06F 3/02; G06F 3/00; G06F 3/023; G06F 3/05
(52) U.S. Cl. ............................... 710/52; 710/53; 710/57
(58) Field of Search ............................ 710/52, 53, 57; 712/35; 375/240

(56) References Cited

U.S. PATENT DOCUMENTS

| | | | |
|---|---|---|---|
| 4,298,954 A | 11/1981 | Bigelow et al. ............. 364/900 |
| 4,378,594 A | 3/1983 | Kenyon ....................... 364/900 |
| 4,546,444 A | 10/1985 | Bullis .......................... 364/550 |
| 4,807,121 A | * 2/1989 | Halford ........................ 710/53 |
| 5,559,562 A | 9/1996 | Ferster ........................ 348/584 |
| 5,664,117 A | 9/1997 | Shah et al. .................. 395/280 |
| 5,875,288 A | 2/1999 | Bronstein et al. ........... 395/109 |
| 6,141,744 A | * 10/2000 | Wing So ....................... 712/35 |
| 6,233,280 B1 | * 5/2001 | Kim et al. ............. 375/240.21 |
| 6,473,815 B1 | * 10/2002 | Lu et al. ....................... 710/52 |

FOREIGN PATENT DOCUMENTS

| | | |
|---|---|---|
| EP | 0 416 281 A2 | 3/1991 |
| EP | 0 463 640 A2 | 1/1992 |

* cited by examiner

Primary Examiner—Jeffrey Gaffin
Assistant Examiner—Joshua D Schneider
(74) Attorney, Agent, or Firm—Wilmer Cutler Pickering Hale and Dorr LLP

(57) ABSTRACT

A direct memory access (DMA) first-in-first-out (FIFO) buffer includes two FIFO devices connected in parallel. An output multiplexer is controlled by a controller to pass to its output data provided by a selected one of the FIFO devices. Data is clocked into one FIFO device until it is full, after which data may be written from it. When data is written from a FIFO device, the FIFO device is emptied before data is again read into it. Using this arrangement, data can be read into one FIFO device while data is written from the other FIFO device.

11 Claims, 5 Drawing Sheets

DATA BUFFER

This invention relates to a data buffer, and in particular to a data buffer having two FIFO devices connected in parallel.

To allow an electronic device to connect with other electronic devices which may be made by other manufacturers and to allow connectivity in general, it is usual to provide an interface conforming to a known standard. Such interface standards include universal serial bus (USB), small computer serial interface (SCSI) and fibre channel (FC) interfaces. The SCSI interface standard has itself evolved, such that there are now fast SCSI, wide SCSI and fast-and-wide SCSI standards. It is common to provide interface converters which allow devices having one interface standard to connect to devices having different interface standards. It is common also to provide an interface converter which connects three or more devices to each other, for example, to allow a computer server to provide data to plural tape drives simultaneously, to allow data back-up. The performance of the interface converter often limits the connection between two devices, in particular limiting the data rate of communication therebetween. In turn, the data transfer performance of an interface converter is limited by the performance of direct memory access (DMA) data buffers which buffer data between different elements of the interface converter.

The architecture of a typical interface converter is shown schematically in FIG. 1, which shows an interface converter 10 comprising generally a primary input/output 11, first and second secondary input/outputs 12, 13, a block of synchronous dynamic RAM (SDRAM) 14 and a DMA arbitrator 15. Other types of RAM may be used in place of the SDRAM 14. Each of the input/outputs 11–13 is connected to a respective 18 bit wide data bus 16–18 via a respective interface controller chip 19–21. The interface controller chips 19–21 may be FAS466 Past Architecture SCSI processor chips, sold by Q-Logic Corp. of 3545 Harbor Boulevard, Costa Mesa, Calif. 92626, USA. Connected at the other end of the data buses 16–18 are respective field programmable gate array (FPGA) chips 22–24. The data buses 16–18 are bi-directional and carry two bytes wide of data with two parity bits. Also present with each of the data buses 16–18 is a four bit wide uni-directional control line (not shown), which passes control information between the FPGAs 22–24 and their respective interface controller chip 19–21. The interface controller chips 19–21 each indicates to its respective FPGA 22–24 when it needs to send or to receive data, and the FPGAs communicate with the DMA arbitrators.

Each of the FPGAs 22–24 contains various circuits, including a 18 to 36 bit converter, a direct memory access (DMA) buffer circuit and a DMA controller circuit (not shown). The FPGAs 22–24 are connected to a common 36 bit wide data bus 25, which is connected also to the SDRAM 14. Each of the FPGAs 22–24 is connected also, via a respective control line 26–28, to the DMA arbitrator 15. The data bus 25, although clocked at the same clock rate as the buses 16–18, is twice as fast as those buses since it is twice as wide. Data transmission always occurs via the SDRAM 14. Data transmission from one of the input/outputs 11 to 13 to the SDRAM is achieved by control of the respective FPGA 22–24, and therefore the associated interface controller chip 19–21, to receive incoming data and to provide it to the 36 bit wide data bus 25 and thence to the SDRAM 14. Here, the DMA buffer and the DMA controller in the respective FPGA 22–24 convert the data from 16 bits wide (plus 2 parity bits) to 32 bits wide (plus 4 parity bits). The SDRAM 14 reads the data from the data bus 25 and stores it at sequential memory locations. The DMA arbitrator 15, in the meantime, switches the other two FPGAs 22–24 off, so that they do not process any data.

Each FPGA device 22–24 communicates with its interface controller chip 19–21 and with the DMA arbitrator 15 in a known manner to ensure that no data is lost. The data is, in effect, transferred at the rate allowed by the slowest device in the data path. Data transfer is achieved in the opposite direction, i.e. from the SDRAM 14 to one of the outputs 11–13, in a similar manner.

Data is passed from the SDRAM 14 to one FPGA 22–24 between data bursts from another FPGA to the SDRAM, under control of the DMA arbitrator 15. In this situation, control of the FPGAs 22–24 and the SDRAM 14 is effected by the DMA arbitrator 15. However, performance is limited by the SDRAM 14, in particular since it requires typically three or four clock cycles to set up before data can be written into it or read from it, which can result in data being delayed. This delay results since a row address command must be separated from a column address command by a pause sufficient to allow the row to be physically selected. This imposes constraints on the size of the data bursts, which are selected as a compromise between the efficiency of transfer of each data burst and the frequency of availability of the FPGAs 22–24 for arbitration by the DMA arbitrator 15. The data bursts must be accommodated by first-in-first-out (FIFO) devices (not shown) which are located in the DMA buffer circuits in the FPGAs. Typically, the size of optimised data bursts is such as to require FIFO devices which are able to read data from a source simultaneously with writing data to a destination to obtain satisfactory data throughout. However, the implementation of this type of FIFO device in certain FPGA integrated circuits can produce slow FIFO devices which can limit the performance of the system as a whole.

It is an aim of the present invention to alleviate these problems.

In accordance with this invention, there is provided a data buffer comprising first and second input/outputs, first and second multiplexers and first and second FIFO devices, in which the first and second input/outputs are connected to respective data inputs of the first multiplexer via respective clocked input latches, a data input of each of the FIFO devices is connected to an output of the first multiplexer, a data output of each of the FIFO devices is connected to a respective data input of the second multiplexer, an output of the second multiplexer is connected to the first input/output via a first switch and a first clocked output latch and is connected to the second input/output via a second switch and a second clocked output latch, the second multiplexer being controllable to connect alternatively its inputs to its output, the FIFO devices and the multiplexers being operated by a common clock signal.

This invention allows the use of FIFO devices which are relatively small in size yet does not require FIFO devices which are capable of reading and writing data simultaneously. It is possible, therefore, to construct a buffer with improved performance, at least in terms of speed, compared to the equivalent conventional buffer arrangement. Latches connected prior to the FIFO devices and after the multiplexer allow synchronised data transfer, which results in increased data rates.

Embodiments of the invention will now be described, by way of example only, with reference to the accompanying drawings, of which:

Figure 1:
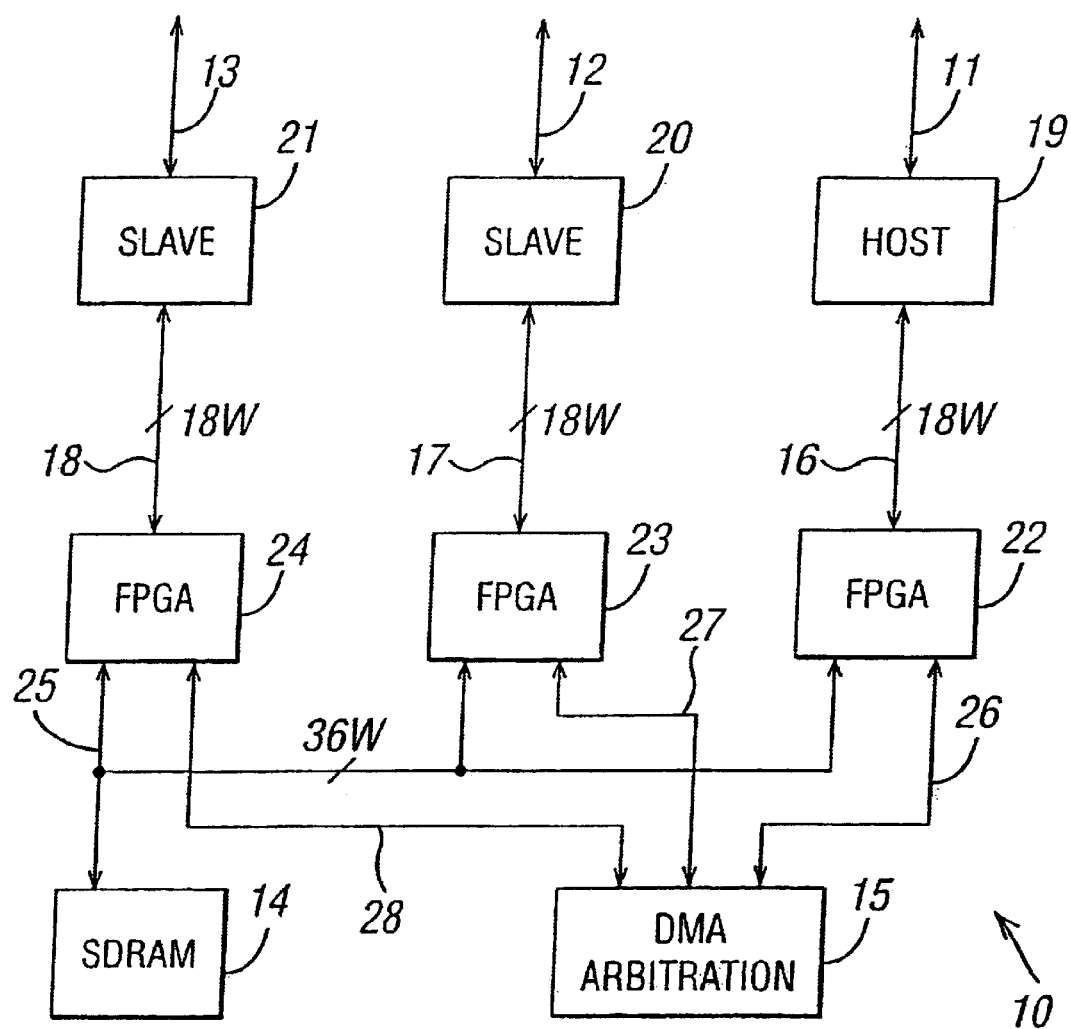
FIG. 1 is a block diagram of an interface converter of known configuration.
Figure 2:
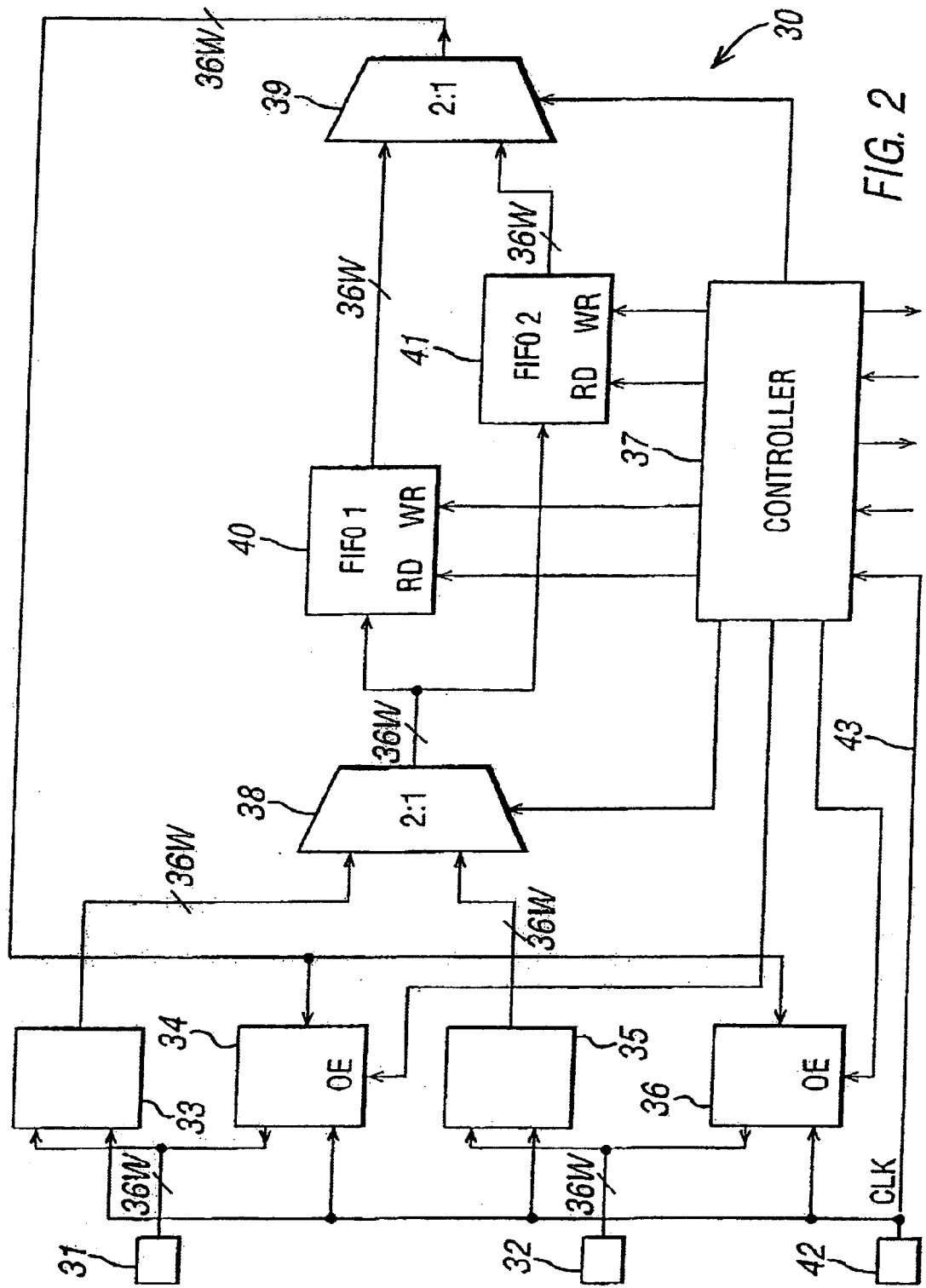
FIG. 2 is a block diagram of a buffer in accordance with the invention.

Referring to the drawings, FIG. 2 shows a DMA buffer 30 in accordance with the invention, which may be incorporated in an FPGA forming part of an interface converter such as that shown in FIG. 1. The buffer 30 has first and second input/output pads 31, 32, first to fourth latches 33–36, a controller 37, first and second 2:1 multiplexers 38, 39, and first and second 36 bit wide×16 bit deep FIFO devices 40, 41. Each of the latches 33–36 and the controller 37 are connected to receive a clock signal, received at a clock pad 42, via a clock line 43. The pads 31, 32 are connected to respective data inputs of the first multiplexer 38, via, respectively, the first and third latches 33, 35, which constitute input latches. The controller 37 is connected to a control input of the first multiplexer 38, and is, therefore, able to select which of the pads 31, 32 is an input pad and thus provides data signals to an output of the first multiplexer. Each of the FIFO devices 40, 41 has its data input connected to the output of the first multiplexer 38, and has its output connected to a respective data input of the second multiplexer 39. The FIFO devices 40, 41 each have a read (RD) input and a write (WR) input connected to the controller 37. The second multiplexer 39 is arranged to pass data signals from a selected one of the FIFO devices 40, 41 to its data output in response to a control input signal received from the controller 37. The second and fourth latches 34, 36 are each connected to the output of the second multiplexer 39. The second latch 34 is connected to the first input/output pads 31 only if an output enable (OE) input, connected to the controller 37, receives a high logic signal. The fourth latch 36 is similarly connected to the second input/output pads 32 only if its OE input receives a high logic signal from the controller 37. The second and fourth latches 34, 36 therefore constitute switches, controllable by the controller 37. The second and fourth latches 34, 36 constitute output latches. The latches 33–36 also each comprise 36 D-type flip-flops connected in parallel, one D-type flip-flop for each data line of the 36 bit lines connected at its data input.

The first and second FIFO devices 40, 41 each have a write input and a read input, by which the controller 37 is able to control them either to read data provided by the first multiplexer 38, or to write data to the second multiplexer 39. The first and second FIFO devices 40, 41 are not able to read and write simultaneously, and are controlled independently of each other. The FIFO devices 40, 41 each have a full flag and an empty flag (not shown), by which the controller 37 can detect full and empty FIFO device conditions.

First and second data paths are defined by enabling certain of the components of FIG. 2. The first data path is defined as including the input latch 33, which is permanently enabled, and the output latch 36, which must be specifically enabled by the controller 37. The first data path, which includes the first multiplexer 38, is enabled when the multiplexer is caused by the controller 37 to pass to its output signals received from the first latch 33. The second data path comprises the input latch 35 and the output latch 34, when enabled, as well as the multiplexer 38. In this case, the first multiplexer 38 is controlled so as to pass to its output data provided by the input latch 35. The two data paths are therefore in opposite directions between the input/output pads 31, 32. Data transfer can be effected from the first input/output pads 31 to the second input/output pads 32 and vice versa, although not simultaneously.

Figure 3:
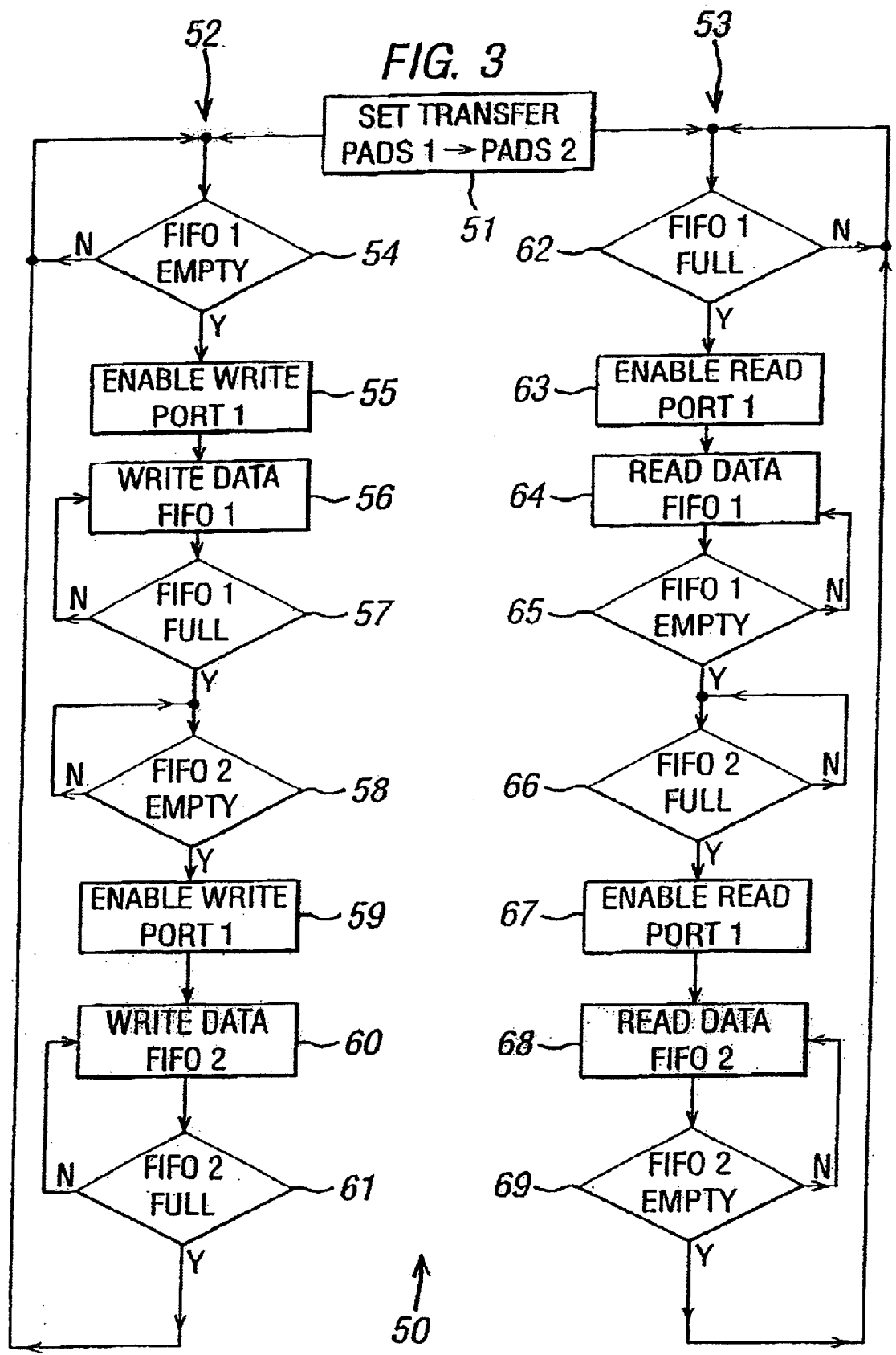
FIGS. 3 and 4 are flow charts illustrating operation of the FIG. 2 buffer.
Figure 4:
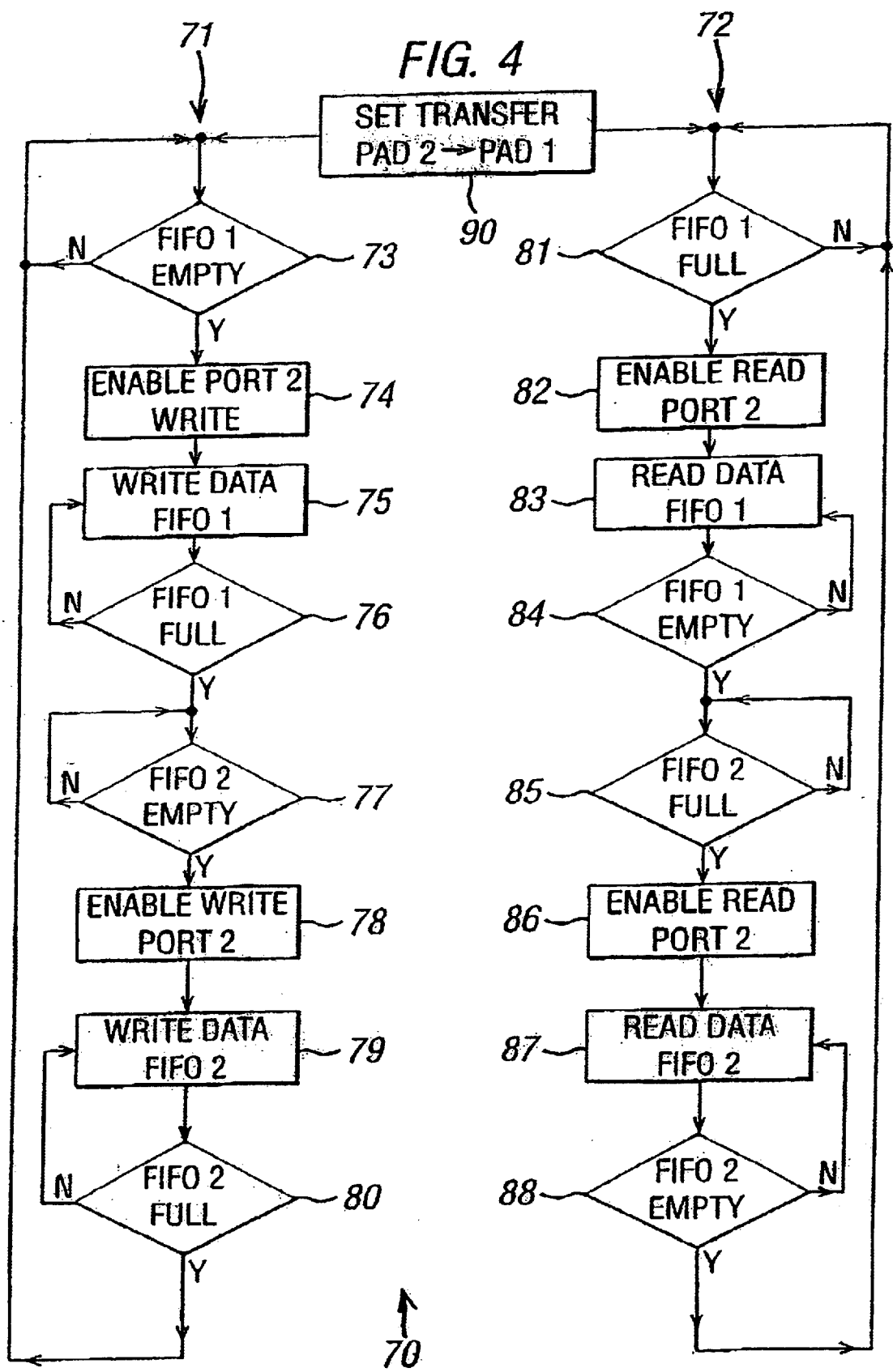

Referring to FIGS. 3 and 4, the operation of the controller 37 is shown in the form of flow diagrams 50 and 70. The flow diagram 50 relates to the writing of data from the first input/output pads 31 to the second input/output pads 32. The flow diagram 70 relates to the writing of data in the opposite direction.

In FIG. 3, a "set transfer, pads 1 to pads 2" block 51 initialises first and second parallel routines marked at 52 and 53. The first routine 52 commences with a block 54, which determines whether the first FIFO device 40 is empty by reading the empty flag (not shown) in that buffer. Only if an empty determination is made does the first routine 52 proceed further. The next block 55 is an "enable write port 1" block. This involves the sending of a signal to the device (not shown) connected to the first input/output pads 31 instructing the device to prepare for writing data and the switching of the first multiplexer 38 to pass to its output data signals received from the first input latch 33. Subsequently, block 56 causes data to be written into the first FIFO device 40 until block 57 determines, from inspection of the full flag in that FIFO device, that the first FIFO device is full. Block 56 involves clocking data through the input latch 33 into the first FIFO device 40. When the first FIFO device 40 is detected as being full, block 58 causes the first routine 52 to remain in a loop until the second FIFO device 41 is detected as being empty, by examination of the empty flag (not shown) in the second FIFO device. Block 59 is the same as block 55 described above, except that the first multiplexer 38 is switched over to its other input. Blocks 60 and 61 are equivalent to blocks 56 and 57, although blocks 60 and 61 relate to the second FIFO device 41 instead of the first FIFO device 40. Once the second FIFO device 41 is full, the routine 52 returns to block 54. It will be seen, therefore, that the first routine 52 waits until a FIFO device 40, 41 is empty before filling it, and only when it is full will the routine move onto the other FIFO device. The first routine always commences by examining the empty flag of the first FIFO device 40.

In the second routine 53, block 62 causes the second routine to wait until the first FIFO device 40 is detected as being full, by examination of its full flag (not shown), after which it proceeds to block 63. At block 63, reading from the first FIFO device 40 is enabled by controlling the second multiplexer 39 to pass to its output data provided by the first FIFO device, by causing the second output latch 36 to allow data to pass therethrough, and by providing a write request control signal to the device (not shown) connected to the second input/output pads 32. Blocks 64 and 65 cause data to be read from the first FIFO device 40 to the second input/output pads 32 until the first FIFO device is empty. Block 66 then causes the second routine 53 to wait until the second FIFO device 41 is full before block 67 enables the reading of data therefrom by switching over the second multiplexer 39, by enabling the second output latch 36 and by providing a write request control signal to the device (not shown) connected to the second input/output pads 32. Data is then read from the second FIFO device 41 to the second input/output pads 32 by block 68, and clocked through the output latch 36 at the clock rate until the second FIFO device is detected as being empty by block 69. The second routine 53 then returns to the first block 62.

It will be appreciated that data writing to the second input/output pads 32 from a given FIFO device 40, 41 is effected only when that FIFO device is detected as being full, and that a FIFO device is emptied before data is written from the other FIFO device to the input/output pads.

Referring to FIG. 4, it will be seen that the flow diagram 70 likewise consists of first and second parallel routines 71 and 72. The first routine 71 relates to writing data from the second pads 32 into the FIFO devices 40, 41, whilst the routine 72 relates to writing data in the opposite direction.

In FIG. 4, a "set transfer, pads 2 to pads 1" block 90 initialises the two parallel routines marked at 71 and 72. The first routine 71 commences with a block 73, which determines if the first FIFO device 40 is empty, achieved through the reading of the empty flag in that buffer. Only if an empty determination is made does the routine 71 proceed. The next block 74 is an "enable write port 2" block. This involves the sending of a signal to the device (not shown) connected to the second input/output pads 32 instructing the device to prepare for writing data, and the switching of the first multiplexer 38 to pass to its output data signals received from the second input latch 35. Subsequently, block 75 causes data to be written into the first FIFO device 40 until block 76 determines, from inspection of the full flag in that FIFO device, that the first FIFO device is full. Block 75 involves clocking data through the input latch 35 into the first FIFO device 40. When the first FIFO device 40 is detected as being full, block 77 causes the routine 71 to remain in a loop until the second FIFO device 41 is detected as being empty, by examination of the empty flag in that FIFO device. Block 78 is the same as block 74 described above, except that the first multiplexer 38 is switched over to its other input. Blocks 79 and 80 are equivalent to blocks 75 and 76, although blocks 79 and 80 relate to the second FIFO device 41 instead of the first FIFO device 40. Once the second FIFO device 41 is full, the routine 71 returns to block 73. It will be seen, therefore, that the routine 71 waits until a FIFO device 40, 41 is empty before filling it, and only when it is full will the routine move onto the other FIFO device.

In the second routine 72, block 81 causes the second routine to wait until the first FIFO device 40 is detected as being full, by examination of its full flag (not shown), when it proceeds to block 82. At block 82, reading from the second FIFO device 40 is enabled by causing the second multiplexer 39 to pass to its output data provided by the second FIFO device, by causing the first output latch 34 to allow data to pass therethrough, and by providing a write request control signal to the device (not shown) connected to the first input/output pads 31. Blocks 83 and 84 cause data to be read from the first FIFO device 40 to the first input/output pads 31 until the first FIFO device is empty. Block 85 then causes the second routine 72 to wait until the second FIFO device 41 is full before block 86 enables the reading of data therefrom by switching over the second multiplexer 39, by enabling the output latch 34 and by providing a write request control signal to the device (not shown) connected to the first input/output pads 31. Data is then read from the second FIFO device 41 to the first input/output pads 31 by block 87, clocked through the output latch 34 at the clock rate, until the second FIFO device is detected as being empty by block 88. The second routine 72 then returns to the first block 81.

Again, data writing to the output pads 31 from a given FIFO device 40, 41 is effected only when that FIFO device is detected as being full, and that a FIFO device is emptied before data is written from the other FIFO device to the input/output pads.

Figure 5:
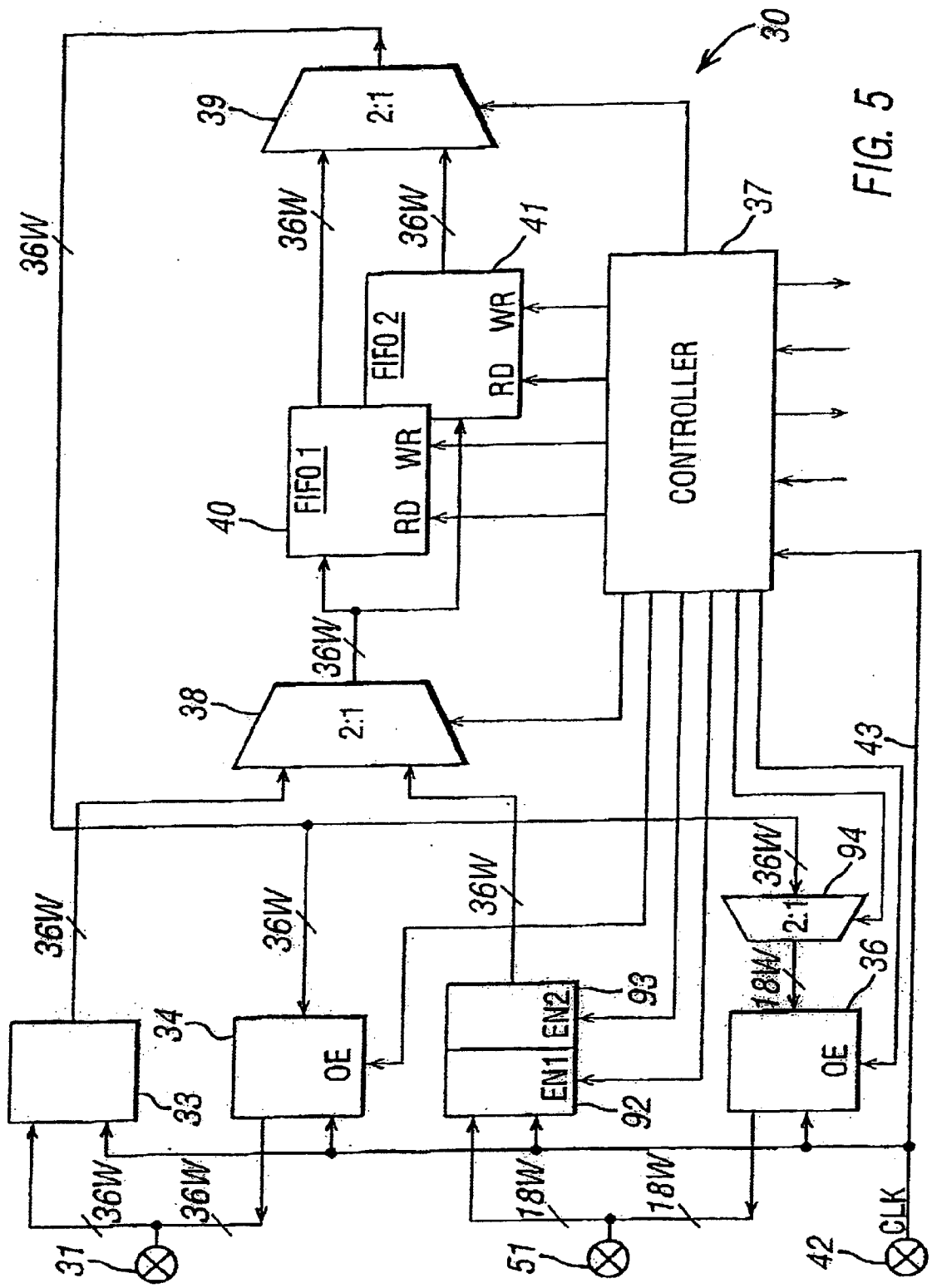
FIG. 5 is a block diagram of a second buffer in accordance with the invention.

FIG. 5 shows an alternative DMA buffer 50 in accordance with the invention, which may be incorporated in an FPGA forming part of an interface converter such as that shown in FIG. 1. Reference numerals are retained from FIG. 2 for like elements. The DMA buffer 50 includes a 36 bit wide input/output 31 and an 18 bit wide input/output 51. Use of the DMA buffer 50 eliminates the need for separate 18 to 36 bit converters to be included in the FPGA's 22–24.

On the input side, fifth and sixth latches 92, 93 are used in place of the third latch 35. The fifth and sixth latches 92, 93 are 18 bit latches and are each connected to the controller 37, to enable control thereby. The fifth and sixth latches 92, 93 in effect operate as a multiplexer, control signals from the controller 37 causing the fifth and sixth latches to be alternately connected to the input/output 51. This generates a 36 bit wide output from an 18 bit wide input.

On the output side, a third 2:1 multiplexer 94 operates under control of the controller 37 to provide an 18 bit wide output to the fourth latch 36 (which comprises 18 D-type flip flops) from the output of the second 2:1 multiplexer 39.

The input latch 33 is arranged to provide to the controller 37 on a connection (not shown) a signal indicative of whether or not it contains data. The controller 37 is therefore able to determine at all times whether or not the input latch 33 will provide data to the multiplexer 38 on the next clock cycle. The controller 37 is also arranged to determine when a one of the FIFO devices 40, 41 which is being read into has only one 36 bit word memory space remaining free before it would be full. This is achieve by examination of the address provided by the controller 37 to the FIFO device 40, 41 which is being read into. Only one memory space is free when the address provided by the controller 37 is equal to the size of the buffer minus one. The controller 37 is also arranged to determine whether or not the other one of the FIFO devices 40, 41 is able to receive data by examining the read (RD) control line connected to it. When a determination is made that the relevant FIFO device 40, 41 is almost full, that the other FIFO device is not ready to be read into (for example because it is not yet empty), and when the latch simultaneously indicates that it has data to clock through at the next clock cycle, the controller 37 provides a wait command to the device (not shown) which is providing data to the first input/output 31. This wait command instructs the device providing data to stop pending further commands. On the next clock cycle, the data held in the input latch 33 is provided via the first multiplexer 38 to the appropriate FIFO device 40, 41, and no data is clocked into the input latch 33. This results in the data transfer to the FIFO device 40, 41 being completed without 'over-run', that is without the latch receiving data that cannot be written into the FIFO device.

The second input latch 35 is connected to the controller 37 in the same manner as the first input latch 33, and the controller is arranged to provide the same mechanism when data is being written into the second input/output 32.

This feature is advantageous since it increases efficiency of data transfer, resulting in an increase in speed.

The controller 37 is arranged also to detect that a one of the FIFO devices 40, 41 which is being read from contains only one remaining 36 bit word of data. The controller 37 is, therefore, aware that the appropriate FIFO device 40, 41 will be empty of data one clock cycle before it actually becomes empty. The output latch 34 is arranged to provide to the controller 37 on a connection (not shown) a signal indicative of whether or not it contains data, in a similar way to the input latch 33 described above. The controller 37 is arranged to detect when a one of the FIFO devices 40, 41 has only one 36 bit word of data to be read out, and on the next clock cycle determines if the other FIFO device is not ready to read out data (for example because it is being written into) and if the output latch 34 contains data. If all these conditions are met, the controller provides a 'no more data' command to the device (not shown) which is reading data from the second input/output. This informs the device connected to the second input/output that no more data is forthcoming on the same clock cycle as the last word of data is transmitted. In conventional arrangements, this command is provided one clock cycle later. This feature, therefore, provides an improvement over such conventional arrangements in that it is more efficient and allows faster operation.

What is claimed is:

1. A data buffer comprising first and second input/outputs, first and second multiplexers and first and second FIFO devices, in which the first and second input/outputs are connected to respective data inputs of the first multiplexer, a data input of each of the FIFO devices is connected to an output of the first multiplexer, a data output of each of the FIFO devices is connected to a respective data input of the second multiplexer, an output of the second multiplexer is connected to the first input/output via a first switch and is connected to the second input/output via a second switch, the second multiplexer being controllable to connect alternatively its inputs to its output, the FIFO devices and the multiplexers being operated by a common clock signal.

2. A data buffer according to claim 1, in which the first and second input/outputs are connected to respective data inputs of the first multiplexer via respective input latches, which are clocked by the common clock signal.

3. A data buffer according to claim 2, further comprising a controller arranged to detect a data containing condition of a one of the input latches, an almost full condition of a one of the FIFO devices and a not empty condition of the other of the FIFO devices and, in response to a positive determination of each of these conditions, to provide a command for effecting the stopping of data sending, to the data buffer.

4. A data buffer according to claim 1, in which the output of the second multiplexer is connected to the first input/output via a first switch and a first output latch and is connected to the second input/output via a second switch and a second output latch, the output latches being clocked by the common clock signal.

5. A data buffer according to claim 4, in which a or the controller is arranged to detect a data containing condition of a one of the input latches, to detect an almost empty condition of a one of the FIFO devices and a not ready for writing condition of the other of the FIFO devices and, in response to a positive determination of each of these conditions, to provide a command for effecting the stopping of data receiving at the data buffer.

6. A data buffer according to claim 1, in which a or the controller is arranged to control switching of the second multiplexer and to cause the FIFO devices to perform read operations and write operations.

7. A data buffer according to claim 6, wherein the controller is arranged to detect full flags of the first and second FIFO devices, the full flags being set only when the respective FIFO device is full of data, and to cause the first and second FIFO devices to write data only in response to detection of their respective full flag being set.

8. A data buffer according to claim 7, wherein the controller is arranged to cause the first and second FIFO devices to write all of their data in a single data burst in response to detection of their respective full flag being set.

9. A data buffer according to claim 6, wherein the controller is arranged to detect empty flags of the first and second FIFO devices, the empty flags being set only when the respective FIFO device is empty of data, and to cause the first and second FIFO devices to read data only in response to detection of their respective empty flags being set.

10. A data buffer according to claim 9, wherein the controller is arranged to cause the first and second FIFO devices to read data until they are full, in response to detection of their respective empty flags being set.

11. An interface converter including a data buffer according to claim 1.

* * * * *